United States Patent
Zorn et al.

(10) Patent No.: US 12,039,257 B2
(45) Date of Patent: Jul. 16, 2024

(54) SYSTEMS, METHODS, AND COMPUTER-READABLE MEDIA FOR IMPROVED TABLE IDENTIFICATION USING A NEURAL NETWORK

(71) Applicant: Microsoft Technology Licensing, LLC, Redmond, WA (US)

(72) Inventors: Benjamin Goth Zorn, Woodinville, WA (US); Marc Manuel Johannes Brockschmidt, Cambridge (GB); Pallavi Choudhury, Redmond, WA (US); Oleksandr Polozov, Seattle, WA (US); Rishabh Singh, Kirkland, WA (US); Saswat Padhi, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1326 days.

(21) Appl. No.: 16/034,447

(22) Filed: Jul. 13, 2018

(65) Prior Publication Data

US 2020/0019603 A1 Jan. 16, 2020

(51) Int. Cl.
*G06F 40/18* (2020.01)
*G06F 16/338* (2019.01)
(Continued)

(52) U.S. Cl.
CPC ............ *G06F 40/18* (2020.01); *G06F 16/338* (2019.01); *G06N 3/04* (2013.01); *G06N 3/08* (2013.01); *G06N 5/046* (2013.01)

(58) Field of Classification Search
CPC ......... G06F 40/18; G06F 16/338; G06N 3/04; G06N 3/08; G06N 5/046
(Continued)

(56) References Cited

U.S. PATENT DOCUMENTS 10,599,627 B2 * 3/2020 Singh ...................... G06F 16/25
2004/0205524 A1 10/2004 Richter et al.
(Continued)

FOREIGN PATENT DOCUMENTS

EP 2601594 A1 6/2013

OTHER PUBLICATIONS

"Using machine learning to parse excel file and extract table data with no named tables involved? If so, how do I get started?—Stack Overflow", Retrieved From: https://stackoverflow.com/questions/47595396/using-machine-learning-to-parse-excel-file-and-extract-table-data-with-no-named, Dec. 2017, 5 Pages.
(Continued)

*Primary Examiner* — Michael Roswell
*Assistant Examiner* — Jenq-Kang Chu
(74) *Attorney, Agent, or Firm* — Faegre Drinker Biddle & Reath LLP

(57) ABSTRACT

Systems, methods, and computer-readable storage devices are disclosed for improved table identification in a spreadsheet. One method including: receiving a spreadsheet including at least one table; identifying, using machine learning, one or more classes of a plurality of classes for each cell of the received spreadsheet, wherein the plurality of classes include corners and not-a-corner; and inducing at least one table in the received spreadsheet based on the one or more identified classes for each cell of the received spreadsheet.

18 Claims, 10 Drawing Sheets

(51) Int. Cl.
*G06N 3/04* (2023.01)
*G06N 3/08* (2023.01)
*G06N 5/046* (2023.01)

(58) Field of Classification Search
USPC .......................................................... 715/200
See application file for complete search history.

(56) References Cited

U.S. PATENT DOCUMENTS

| | | | |
|---|---|---|---|
| 2006/0167911 | A1 | 7/2006 | Le Cam |
| 2011/0066933 | A1* | 3/2011 | Ludwig ................ G06F 40/103 715/212 |
| 2011/0295904 | A1* | 12/2011 | Mohan .................... G06F 40/18 707/802 |
| 2013/0022278 | A1* | 1/2013 | Takeda ................. G06V 30/164 382/218 |
| 2017/0124432 | A1* | 5/2017 | Chen ........................ G06N 5/04 |
| 2018/0341839 | A1* | 11/2018 | Malak .................. G06F 40/205 |
| 2019/0179940 | A1* | 6/2019 | Ross ................. G06F 16/24535 |

OTHER PUBLICATIONS

Dong, et al., "TableSense: Spreadsheet Table Detection with Convolutional Neural Networks", Retrieved From: https://www.microsoft.com/enus/research/uploads/prod/2019/01/TableSense_AAAI19.pdf, Jan. 27, 2019, 8 Pages.

Doush, et al., "Detecting and Recognizing Tables in Spreadsheets", In Proceedings of The 9th IAPR International Workshop on Document Analysis Systems, Jun. 9, 2010, pp. 471-478.

"International Search Report and Written Opinion Issued in PCT Application No. PCT/US19/037579", Mailed Date: Sep. 18, 2019, 11 Pages.

Abraham, et al., "Header and Unit Inference for Spreadsheets Through Spatial Analyses", In Proceedings of IEEE Symposium on Visual Languages and Human Centric Computing, Sep. 26, 2004, 8 Pages.

Embley, et al., "Converting heterogeneous statistical tables on the web to searchable databases", In International Journal on Document Analysis and Recognition, vol. 19, Issue 2, Jun. 1, 2016, pp. 1-21.

Koci, et al., "A machine learning approach for layout inference in spreadsheets", Proceedings of the International Joint Conference on Knowledge Discovery, Knowledge Engineering and Knowledge Management, Nov. 9, 2016, pp. 77-88.

Shigarov, et al., "Rule-Based Spreadsheet Data Transformation from Arbitrary to Relational Tables", In Journal of Information Systems, vol. 71, Nov. 1, 2017, pp. 1-47.

"Office Action Issued in European Patent Application No. 19740439.5", Mailed Date: Jun. 13, 2023, 5 Pages.

"Office Action Issued in India Patent Application No. 202117000686", Mailed Date: Oct. 17, 2022, 6 Pages.

\* cited by examiner

Figure 1

| Year | Total hours (in millions) | Annual hours per worker | Total number of workers (thousands) | GDP in 1995 prices (millions of Krones) | Share in GDP of Labour | Share in GDP of IT-capital | Share in GDP of Non-IT Capital | Capital service growth rate of IT | Capital service growth rate of Non-IT | Capital service growth rate of All asset types | TFP growth |
|---|---|---|---|---|---|---|---|---|---|---|---|
| 1980 | 6,362 | 1,507 | 4,226 | 1,186,534 | 0.727 | 0.021 | 0.251 | 0.124 | 0.033 | 0.040 | 0.003 |
| 1981 | 6,306 | 1,495 | 4,219 | 1,180,946 | 0.724 | 0.021 | 0.255 | 0.129 | 0.031 | 0.036 | -0.010 |
| 1982 | 6,355 | 1,508 | 4,213 | 1,194,517 | 0.716 | 0.020 | 0.263 | 0.117 | 0.026 | 0.032 | -0.003 |
| 1983 | 6,462 | 1,518 | 4,218 | 1,218,968 | 0.693 | 0.022 | 0.284 | 0.144 | 0.028 | 0.035 | 0.004 |
| 1984 | 6,458 | 1,520 | 4,249 | 1,277,676 | 0.670 | 0.025 | 0.305 | 0.179 | 0.027 | 0.038 | 0.028 |

Figure 5

SYSTEMS, METHODS, AND COMPUTER-READABLE MEDIA FOR IMPROVED TABLE IDENTIFICATION USING A NEURAL NETWORK

TECHNICAL FIELD

The present disclosure relates to table identification in a spreadsheet. Specifically, the present disclosure relates to improved table identification in a spreadsheet using a neural network.

INTRODUCTION

A spreadsheet may allow for a flexible arrangement of data, computation, and presentation in order to provide users, having experience ranging from novices to programming experts, an ability to inspect, calculate, and make decisions based on the data in the spreadsheet. While the flexible arrangement of data provides many uses, the flexible arrangement of data may also hamper automatic tools that may benefit from a well-formed table structure.

There is a problem of automatically identifying table boundaries in a spreadsheet. While identifying table boundaries may be intuitive to a person, rule-based approaches to identifying table boundaries have had limited success due to a variety of visual information and data in a spreadsheet.

While the present disclosure specifically discusses table identification in a spreadsheet, aspects of the present disclosure may be applicable not only to spreadsheets but may also be applicable to other file types including tables and/or flexible data arrangements.

SUMMARY OF THE DISCLOSURE

According to certain embodiments, systems, methods, and computer-readable media are disclosed for improved table identification.

According to certain embodiments, a computer-implemented method for improved table identification in a spreadsheet is disclosed. One method including: receiving a spreadsheet including at least one table; identifying, using machine learning, one or more classes of a plurality of classes for each cell of the received spreadsheet, wherein the plurality of classes include corners and not-a-corner; and inducing at least one table in the received spreadsheet based on the one or more identified classes for each cell of the received spreadsheet.

According to certain embodiments, a system for improved table identification in a spreadsheet is disclosed. One system including: a data storage device that stores instructions for improved table identification in a spreadsheet; and a processor configured to execute the instructions to perform a method including: receiving a spreadsheet including at least one table; identifying, using machine learning, one or more classes of a plurality of classes for each cell of the received spreadsheet, wherein the plurality of classes include corners and not-a-corner; and inducing at least one table in the received spreadsheet based on the one or more identified classes for each cell of the received spreadsheet.

According to certain embodiments, a computer-readable storage device storing instructions that, when executed by a computer, cause the computer to perform a method for improved table identification in a spreadsheet is disclosed. One method of the computer-readable storage devices including: receiving a spreadsheet including at least one table; identifying, using machine learning, one or more classes of a plurality of classes for each cell of the received spreadsheet, wherein the plurality of classes include corners and not-a-corner; and inducing at least one table in the received spreadsheet based on the one or more identified classes for each cell of the received spreadsheet.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

FIG. 1 depicts an exemplary spreadsheet having two vertically-aligned tables, according to embodiments of the present disclosure;

FIG. 5 depicts another exemplary spreadsheet having at least one table, which may have mis-identified tables, according to embodiments of the present disclosure;

Figure 2:
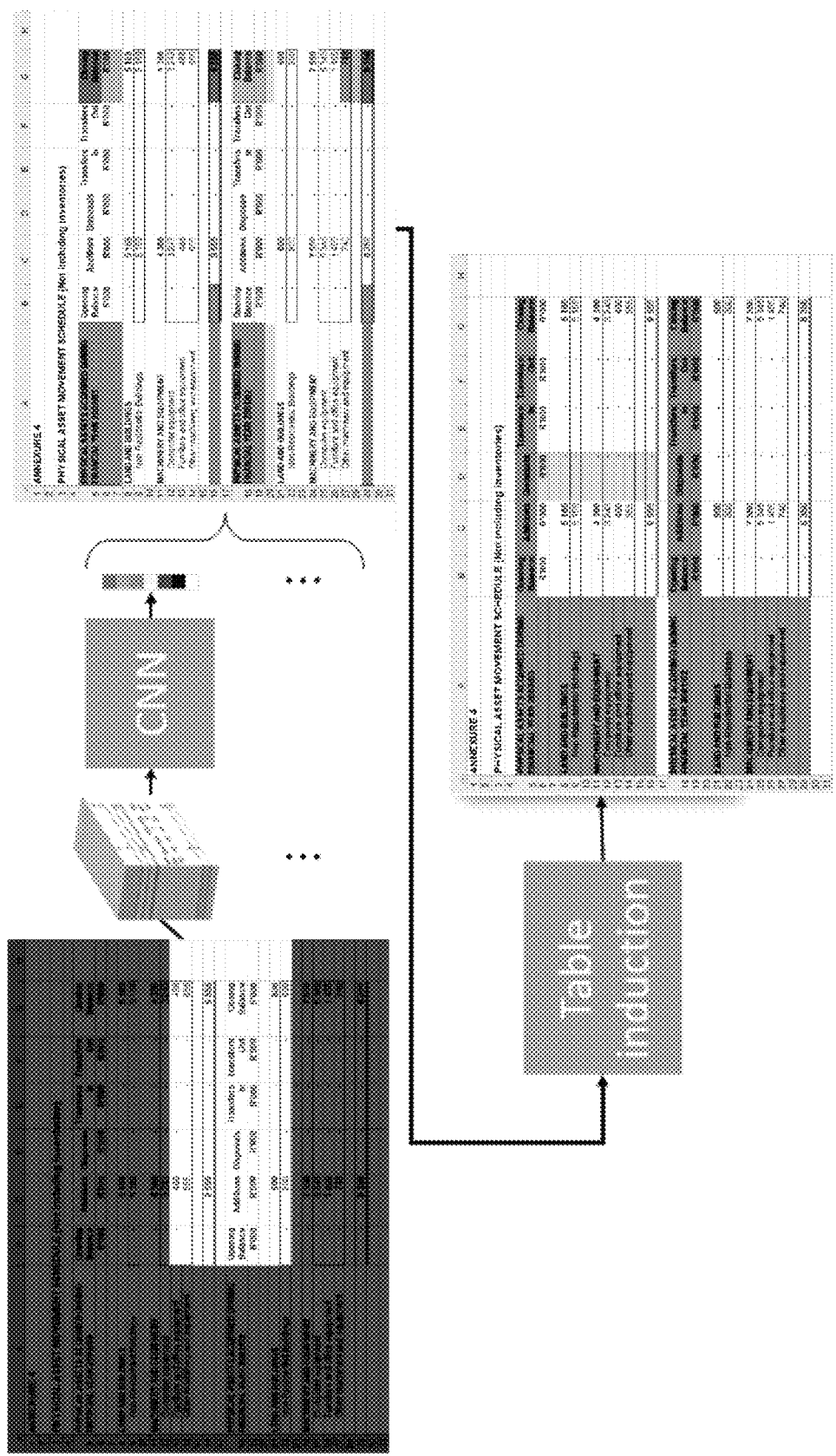
FIG. 2 depicts an exemplary high-level overview of a table identification decomposed into corner identification and table induction, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, a methodology to improve table identification in a spreadsheet using a neural network. While the present disclosure specifically discusses table identification in a spreadsheet, aspects of the present disclosure may be applicable not only to spreadsheets but may also be applicable to other file types including tables and/or flexible data arrangements.

Figure 1:
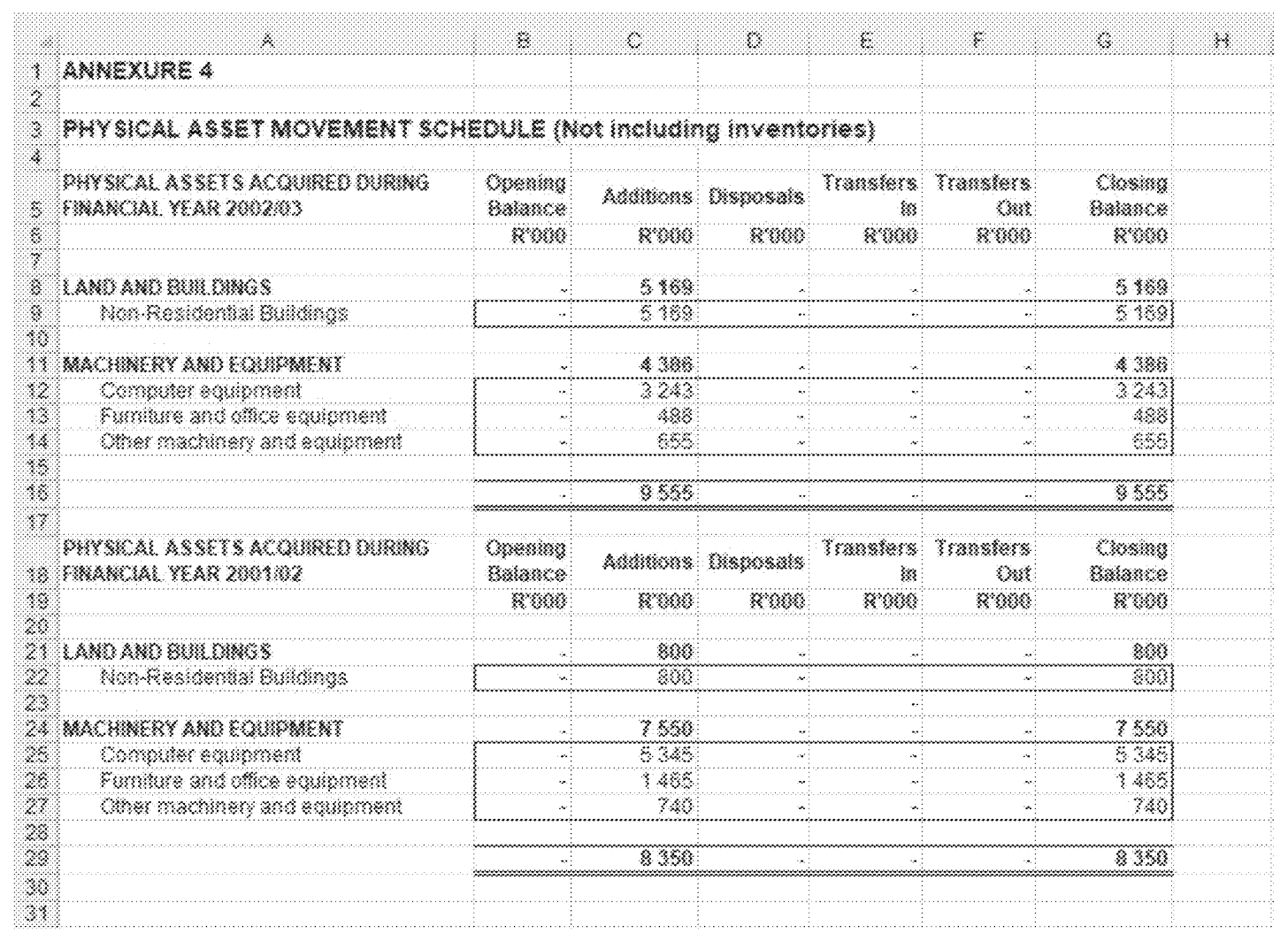

Turning to FIG. 1, FIG. 1 depicts an exemplary spreadsheet having two vertically-aligned tables, according to embodiments of the present disclosure. As shown in FIG. 1, two tables may be present in the spreadsheet (i.e., a first table with a top left corner at cell A5 and a bottom right corner at cell G16, which is denoted as A5:G16, and a second table with a top left corner at cell A18 and a bottom right corner at cell G29, which is denoted as A18:G29). The two tables, as shown in FIG. 1, are vertically stacked and include text describing contents of columns and rows. Automatically detecting the two tables may be challenging because of the various information and data included in the spreadsheet. One reason automatic detection of tables may be difficult is that empty rows (e.g., rows 7 and 15) may increase readability, but empty rows may confuse attempts to detect table boundaries. Another reason automatic detection of tables may be difficult is that table headers may irregular (e.g., rows 6 and 19 have the cell in column A empty), which may confuse classification of rows as headers. Yet another reason automatic detection of tables may be difficult is that use of cell outlining may be inconsistent. Thus, a rich variety of layouts and visual cues may make automatic table identification techniques brittle and ineffective.

Automatic table extraction from spreadsheets may have a variety of uses. For example, extracting individual tables in a spreadsheet as database relations may allow for application of database queries to datasets, and may potentially include filters and joins across a plurality of tables and queries based on natural language. Additionally, analysis of data types based on header information of one or more tables in spreadsheets may be used for type inference and/or consistency validation.

In embodiments of the present disclosure, a table in a spreadsheet may be a rectangular region of cells that include rows and columns and have data, and a table may include one or more additional rows at a top of the table including strings, such as text, with descriptive information about data in columns, which may be referred to as table headers. A table in a spreadsheet may also include one or more subtotal rows, which may summarize data in a column using aggregation functions and/or percentages.

Exemplary embodiments of the present disclosure describe a table identification technique that uses a convolutional neural network to identify independent corners of one or more tables, such as a patch-based convolutional neural network. However, the present disclosure may not be limited to convolutional neural networks, and embodiments of the present disclosure may use other types of neural networks for table identification. After identifying candidates for each corner, corners may be stitched together to build one or more tables.

Discussed in more detail below, embodiments of the present disclosure provide an approach to table identification that applies a convolutional neural network ("CNN") on a rectangular context surrounding a cell to classify the cell as a potential corner, and then combines the corner predictions according to a graphical model to identify tables. The table identification approach is end-to-end data-driven, orders-of-magnitude faster than full-spreadsheet convolution and/or object detection, and enables generation of a large training dataset from a limited number of spreadsheets, such as from 1,638 spreadsheets, as discussed below.

In embodiments of the present disclosure, S may be a spreadsheet of R×C cells, where R is a number of rows and C is a number of columns. A spreadsheet S may include one or more tables $T_1, \ldots, T_n$, having one or more visual cues and other features, such as borders, colors, font styles, and/or spacing conventions. Each table may be a rectangular region or a square region of spreadsheet S, identified by six (6) corner cells including top-left ("TL"), top-right ("TR"), bottom-left ("BL"), bottom-right ("BR"), header-bottom-left ("HBL"), and header-bottom-right ("HBR"). In spreadsheet notation, a table may be defined as a region TL:BR, with its header region TL:HBR.

Returning to FIG. 1, FIG. 1 depicts an exemplary spreadsheet with multiple tables. Given the spreadsheet S, such as the spreadsheet of FIG. 1, the table identification problem may be as follows: (a) identify whether the spreadsheet S includes any tables; and (b) identify a position of each table in spreadsheet S and respective column headers.

As FIG. 1 illustrates, the table identification problem may be challenging for a variety of reasons including that a table may be specified using a variety of visual and other attributes of one or more cells of the spreadsheet that, in different combinations, may identify a table. A rule-based table identification based on the variety of visual and other attributes may be brittle and tedious to construct. Additionally, a table in a spreadsheet may be sparse by utilizing empty rows and/or columns to arrange content in the table of the spreadsheet in order to appear clearer on a page. Thus, a common heuristic of "a largest dense rectangle/square around a given cell" (used in industrial spreadsheet software, such as Microsoft Excel and Google Sheets) may be ineffective in many spreadsheets. Table identification should be as precise as possible because an error in several rows and/or columns may ignore valuable data in a spreadsheet.

In order to train a neural network, spreadsheets, each having zero or more tables, were used as a data set. Discuss below are exemplary technical details of an embodiment of the present disclosure. Training data for training a neural network may come from a plurality of sources, including, but not limited to, expert annotating corpora of spreadsheets, crowdsourced annotations of corpora of spreadsheets, and/or a mix of different methods.

For example, exemplary embodiments of the present disclosure were tested using a collection of spreadsheets from publicly available datasets, which include spreadsheets from different domains and/or a variety of different sources. For example, table identification datasets may be open-source and/or closed sourced collections of personal and/or business spreadsheets.

A preliminary service may be used to examine the spreadsheets to determine whether the spreadsheets include tables having data. For example, a preliminary group of annotators may be used to identify spreadsheets that have tables with data. Then, a predetermined number of annotations may be performed on the spreadsheets. After the predetermined number of annotations are performed, the remaining spreadsheets of an annotated dataset may include at least a single table.

After processing the spreadsheets to determine whether the spreadsheet included tables having data, a second service may annotate the remaining spreadsheets. For example, for each spreadsheet, annotators may identify one or more tables in the spreadsheet, and label corners of each table and any header rows of the table. Referring back to FIG. 1, table identification may be challenging for services and/or annotators, and the services and/or annotators may not agree on a table, corners, and/or header rows. Thus, a majority consensus may be used among the annotators when available. Alternatively, and/or additionally, a label of an annotator with the most experience may break any ties.

According to embodiments of the present disclosure, a dataset used to train a neural network may be processed to produce an annotated dataset prior to training the neural network. The processing may be performed by an automated service, one or more annotators, and/or a crowd of annotators. Crowd annotations may establish a baseline of human performance on table identification.

The automatically annotated spreadsheets by a service may be combined with the spreadsheets annotated by other methods, such as expert annotators. The combined annotated spreadsheets may constitute a training dataset for table identification. When a combined dataset is used, for overlapping files, annotations by expert annotators may take priority for ground truth.

As discussed above, embodiments of the present disclosure use a trained convolutional neural network ("CNN") for table identification. A CNNs may overcome a challenge of processing a spreadsheet, which may include tens of thousands of cells. For example, a 10,000-wide full-image convolution with 50+ channels on a consumer-grade machine may be impractically slow. Further, CNNs, as used in embodiments of the present disclosure, may overcome a challenge of requiring hundreds of thousands of data points to learn high-level features of the data. For example, annotated table identification datasets of this magnitude may not exist.

To address both challenges, table identification may be decomposed into two phases (a) corner identification and (b) table induction. Corner identification may apply a CNN to detect cells in a spreadsheet that are likely a header or a corner of a table. Table induction combines sets of corner cells into candidate tables using a probabilistic graphical model. FIG. 2 depicts an exemplary high-level overview of a table identification decomposed into corner identification and table induction, according to embodiments of the present disclosure. Reducing table identification to corner identification may allow for recasting the problem in terms of per-cell classification, which admits a lot more available data and enables much faster convolutions of local patches.

The corner identification phase of table identification may solve the following problem: given a context patch of W×W cells, classify the center cell of the patch as one of the 6 kinds of table corners (i.e., TL, TR, BL, BR, HBL, or HBR, as discussed above), or not-a-corner ("NaC"). To avoid multi-class classification issues, a HBL corner or a HBR corner may be defined as the cell appearing directly below a visual table header on the left table boundary or right table boundary, respectively.

To classify a cell of a spreadsheet as a table corner, a neural network may take into account a variety of visual and other features of the cell and an immediate surrounding context of the cell. Each cell in a patch may be represented with a predetermined amount of channels encoding visual and other cell features, such as, for example, F=51 features including font style, colors, borders, alignment, datatype formatting, etc.

Figure 3:
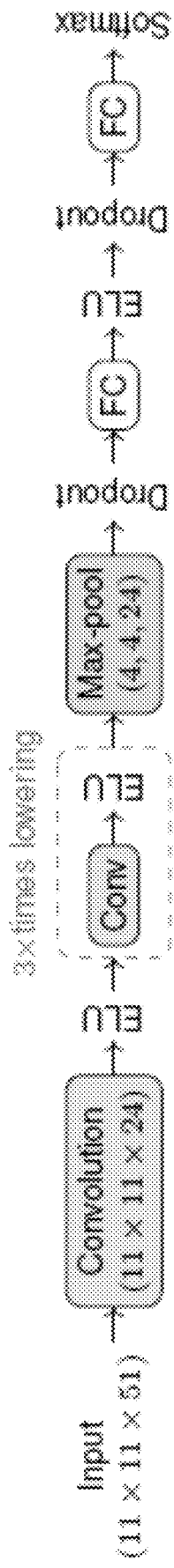
FIG. 3 depicts an exemplary architecture of a convolutional neural network for corner identification, according to embodiments of the present disclosure.

FIG. 3 depicts an exemplary architecture of a convolutional neural network for corner identification, according to embodiments of the present disclosure. The CNN for corner identification may process a W×W×F input volume, according to a pipeline as shown in FIG. 3 to predict a 7-way softmax distribution over the corner classes C={TL, TR, BL, BR, HBL, HBR, NaC}. The CNN architecture may apply a bottleneck convolution down to 24 features. Then, the CNN architecture may up sample up to 40 features. Afterwards, the CNN may apply three (3) stacks of convolutional layers with exponential linear unit ("ELU") activation functions, followed by two fully-connected layers with dropout. The convolutional neural network may be trained to not over fit. Deeper convolutional neural networks may be used with more layers of fully-connected layers. The convolutional neural network model may be constructed to include a plurality of neurons, and may be configured to output the one or more classes of the plurality of classes for each cell of a received spreadsheet. The plurality of neurons may be arranged in a plurality of layers, including at least one hidden layer, and may be connected by a plurality of connections. While FIG. 3 depicts a specific exemplary CNN architecture, any CNN architecture may be used that obtains a probability distribution over the classes.

According to exemplary embodiments of the present disclosure, to train the neural network for corner identification, training patches may be generated for each table from the annotated ground truth dataset, as discussed above. Specifically, for each ground truth table T in the training dataset, corner patches may be extracted, as well as a predetermined amount of samples of NaC patches, such as N=30 NaC patches, from various critical locations in the table. The critical locations of NaC patches in a table include one or more of a table center, midpoints of sides, gaps between the headers and data, cells surrounding table corners, and a sample of random cells normally distributed around the target corners. The neural network model may be trained using a categorical cross-entropy objective over a predetermined amount of classes, such as, for example, the seven classes of TL, TR, BL, BR, HBL, HBR, and NaC.

A key challenge in the training procedure may be class imbalance, as there may be many more not-a-corner ("NaC") cells than corner cells. For example, each table provides only a single example for each kind of corner, but may include a plurality of examples for the NaC cells. To correct class imbalance, one or more regularization techniques may be applied. One regularization technique includes undersampling $\eta \cdot N$ of possible NaC cells for each table, where $\eta$ may be a hyper-parameter that may be optimized on a validation set, as discussed below. Another regularization technique includes applying a dropout with a predetermined probability p, where p may be a hyper-parameter. As shown in the CNN model of FIG. 3, the predetermined probability p may be, for example, p=0.5. Yet another regularization technique includes applying data augmentation to introduce additional corner examples with synthetic noise, where each synthetic example may add a small random noise around a corner cell, only in the out-of-table cells. The noise may follow a symmetric bimodal normal distribution with peaks at edges of an input patch and $\sigma=(W/2)^{1/4}$. Thus, a total number of corner examples for each table may match a number of NaC examples. Still yet another regularization technique includes re-scaling weights for the training examples of each table so that the total weights for corner examples match the total weights of NaC examples.

For corner identification a high recall may be more important than high precision. The purpose of corner identification is to propose candidates for subsequent table induction from the corners. Table induction may be robust to false positive corners, as it is unlikely that all the proposed corners are false. However, Table induction may be sensitive to false negatives. Thus, one or more of the above-described regularization techniques may increase the likelihood of the neural network model identifying all true corners, while de-emphasizing the NaC classification.

Turning to the second phase of table identification, table induction may use candidate corners proposed by the corner identification of the neural network model to induce the most likely set of tables appearing in a given spreadsheet. A key challenge of table induction may be uncertainty. The corner candidates identified by the CNN may be noisy and include false positives. To accurately model the problem of table induction from noisy corner candidates, a probabilistic graphical model ("PGM") may be used.

Figure 4:
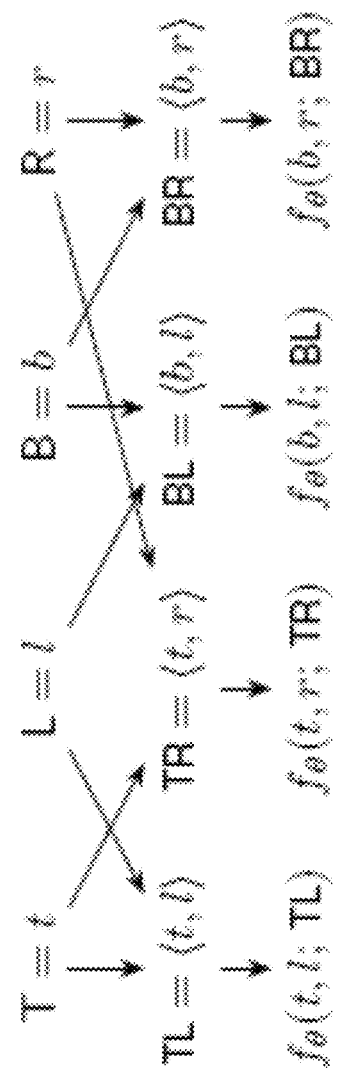
FIG. 4 depicts an exemplary probabilistic graphical model of events positioning of a table, according to embodiments of the present disclosure.

FIG. 4 depicts an exemplary probabilistic graphical model of events positioning of a table, according to embodiments of the present disclosure. T=t, B=b, L=l, and R=r may be independent events denoting the top, bottom, left, and right boundary lines of a target table T being equal to t, b, l, and r, respectively. $f_\theta(x,y; \gamma)$ may be a probability of a cell $\langle x, y \rangle$ belonging to a corner class $\gamma \in C$, as estimated by the corner identification model $f_\theta$ applied to a patch centered at the cell $\langle x,y \rangle$. From $f_\theta$, the estimated probabilities of the table corners appearing at an intersection of corresponding boundary lines, e.g., $Pr(T=t, L=l)=f_\theta(t,l; TL)$, may be observed. A spatial confidence score of a candidate table T may be computed as follows.

$$Pr(T = \langle t, l \rangle : \langle b, r \rangle) := \sqrt{f_\theta(t, l; TL) \cdot f_\theta(t, r; TR) \cdot f_\theta(b, l; BL) \cdot f_\theta(b, r; BR)} \quad (1)$$

Algorithm 1, as shown below, provides an algorithm for table induction, according to embodiments of the present disclosure. The algorithm for table induction may begin by assigning each cell $\langle x, y \rangle \in S$ a class $\gamma \in C$ if a probability of the cell as predicted by $f_\theta$, is at least a predetermined amount, such as 0.5. The algorithm for table induction may then score each table candidate using a spatial confidence for the table according to formula (1) above. The algorithm for table induction may also suppress overlapping tables with a lower spatial confidence score. To ensure the tables match the real-world semantics, the algorithm for table induction may vertically merge tables that do not have at least one well-defined header. Finally, the algorithm for table induction may select the tables with a spatial confidence score above a predetermined threshold $\tau$, which may be a hyper-parameter optimized on a validation dataset, as mentioned above.

---
Algorithm 1: Table Induction
---
Input: corner candidates
Output: identified tables
1:   Let $f_\theta$ (x, y) := $\gamma$ iff $f_\theta$ (x, y; $\gamma$) ≥ 0.5, $\gamma \in$ C
2:   $\tilde{T} \leftarrow \{\langle t, l \rangle : \langle b, r \rangle \mid 1 \le t, b \le R \wedge 1 \le l, r \le C \wedge f_\theta(t, l) =$ TL $\wedge ... \wedge f_\theta$ (b, r) = BR $\}$
3:   Remove any overlapping tables from $\tilde{T}$, leaving only the ones with max Pr(T) in each overlapping group
4:   for $T_1 = \langle t_1, l \rangle : \langle b_1, r \rangle$ , $T_2 = \langle t_2, l \rangle : \langle b_2, r \rangle \in \tilde{T}$ do (assuming $t_2 > t_1$)
5:      if $\nexists$ h > $t_2$s. t. $f_\theta$(h, l) = HBL, $f_\theta$(h, r) = HBR
6:      Merge $T_2$ into $T_1$ in $\tilde{T}$
7:   return $\{T \in \tilde{T} | PR(T) > \tau\}$

---

The dataset for training the neural network model, as described above, may be split into a plurality of datasets. For example, the dataset may be split and/or partitioned into a training dataset, a validation dataset, and a test dataset. In exemplary embodiments of the present disclosure, the spreadsheets annotated by a preliminary service may be used for training. Among the annotated spreadsheets, various predetermined percentages may be used for different datasets. For example, 50% may be delegated as a training dataset, 30% may be delegated as a validation dataset, and 20% may be delegated as a test dataset. Small tables, such as 2×2 cells or less, may be removed, as such annotated tables may lead to false positives.

In order to evaluate various aspect of exemplary embodiments of the present disclosure, different performance metrics may be used. One metric that may be used is mean Jaccard precision/recall. Mean Jaccard precision/recall may be used for object detection. With mean Jaccard precision and recall may be defined as follows: precision=true positive area/predicted area, and recall=true positive area/ground truth area, and area may be a number of cells covered by a proposed table. Precision, recall, and F-measure may be averaged over different tables.

Another metric that may be used is mean normalized mutual information ("NMI"), which is a metric commonly used for evaluation of clustering techniques. The table identification problem, as discussed herein, may be seen as clustering of spreadsheet cells, with tables corresponding to clusters. Formally, for ground truth tables $T^*_1, \ldots, T^*_n$ and predicted tables $T_1, \ldots, T_m$, over a spreadsheet S, each cell $c \in S$ may be associated with a respective true cluster $tc(c) \in \{0, 1, \ldots, n\}$ and predicted cluster $pc(c) \in \{0, 1, \ldots, m\}$. NMI maybe be computed as NMI ($[tc(c_1), \ldots, tc(c_{|S|})]$, $[pc(c_1), \ldots, pc(c_{|S|})]$). For simplicity, in embodiments of the present disclosure, only cells in a bounding box around all predicted and ground truth tables may be considered.

Both mean Jaccard precision/recall and mean normalized mutual information may be used in different scenarios. Precision/recall may be a common evaluation metric for per-table predictions. However, spreadsheets may include multiple tables, and disambiguating the multiple tables may be part of the challenge of the table identification problem, as illustrated by FIG. 1. NMI may be a clustering metric that measures accuracy of a predicted set of tables with respect to the ground truth per-spreadsheet.

The corner identification neural network models may be trained using an open-source software library, such as TensorFlow, over a predetermined amount of time, such as 16 epochs (10-12 hours per model), on various types of computer hardware, such as by using two NVIDIA GTX 1080Ti GPUs. The experiments for embodiments of the present disclosure, as presented below, were run on an Intel Xeon 3.60 GHz 6-core CPU with 32 GB RAM (used for feature extraction and table induction) and a single NVIDIA GTX 1080Ti GPU (used for corner identification).

Table identification techniques using neural networks according to exemplary embodiments of the present disclosure were evaluate against baselines include built-in table detection in Microsoft Excel, rule-based detection, and cell classification via random forests. Performance was evaluated using exact table identification, normalized mutual information over cell clusterings, and overlap-based Jaccard metrics, in addition to other metrics.

For example, exemplary embodiments of the present disclosure were tested using a collection of spreadsheets from various datasets. Using a Jaccard index metric, exemplary embodiments of the present disclosure have an overall precision of 74.9% and a recall of 93.6%, with a F-measure of 83.2%, which may be comparable to and 86.9% precision, 93.2% recall, and a 89.9% F-measure for human performance.

The data-driven approach, as discussed herein, may detect tables more accurately than rule-based methods. Because of the inherent difficulty of table identification problem, table identification using a neural network may be evaluated against two rule-based baselines. As mentioned above, the first baseline is the "Select Table" feature in Microsoft Excel, which selects a largest dense rectangle around a given cell. The second baseline is an independent rule-based implementation of table detection, which finds a largest contiguous block of rows with compatible datatype signatures (with empty cells assumed "compatible" with any data type), ignoring gaps. Both the first and second baselines detect a table around a given cell, which may be selected by a user. The interaction may be emulated by selecting m=5 random cells in the ground truth table and averaging metrics over m. However, such emulation may preclude measuring NMI for the rule-based baselines.

Table 1 summarizes the results, using exemplary embodiments of the present disclosure, from our hyper-parameter sweep and ablation testing, as discussed in detail below. Specifically, $\eta = 1/4$, $\tau = 3/4$, and W=11.

As shown below, exemplary embodiments of the present disclosure may outperform both rule-based approaches with respect to both Jaccard recall and F-measure. Rule-based approaches may have a high precision and a low recall due to conservative implementation, which only covers certain patterns of real-world tables, Data-driven table identification, such as embodiments of the present disclosure, may be able to cover a much more diverse range of sparse table layouts.

TABLE 1

| | Microsoft Excel | | | | Rule-Based | | | | Present Disclosure | | | |
| --- | --- | --- | --- | --- | --- | --- | --- | --- | --- | --- | --- | --- |
| | P | R | F | I | P | R | F | I | P | R | F | I |
| Validation | 86.9 | 63.0 | 73.1 | — | 69.2 | 66.7 | 67.9 | — | 76.0 | 90.4 | 82.6 | 88.2 |
| Test | 83.3 | 58.8 | 68.9 | — | 77.7 | 71.2 | 74.3 | — | 74.9 | 93.6 | 83.2 | 87.3 |

As shown in Table 1, P denotes Jaccard precision, R denotes Jaccard recall, F denotes F-measure, and I denotes NMI. Each value shown in Table 1 is in percentages (%).

DeExcelerator project, another type data driven approach, may use random forests and support vector machines ("SVMs") to classify spreadsheet cells into various data/header/metadata types, and then may apply a rule-based algorithm to merge geometric regions induced by these classifications into tables. Comparing embodiments of the present disclosure to other types of data driven approaches may be performed by evaluating table identification of the present disclosure on their dataset against the alleged results of other types of data driven approaches. For this evaluation, the following metric may be used:

$$matchDE(\text{ground truth table } T^*, \text{predicted table } T) := \quad (2)$$
$$\frac{\text{overlap}(T^*, T)}{\max\{|T^*|, |T|\}} \geq 0.8$$

The above metric, as shown in Formula (2), and data associated therewith may not match a free-form real-world definition of tables. The definition, and respective annotations, of tables is contiguous with respect to similarly typed regions, as appropriate for other types of rule-based table induction algorithm.

FIG. 5 depicts another exemplary spreadsheet having at least one table, which may have mis-identified tables, according to embodiments of the present disclosure. Specifically, the spreadsheet is mis-identified as having four (4) tables according to other types of type data driven approach. Embodiments of the present disclosure may identify a single table having empty rows and empty columns. In such situation of disagreement, an additional evaluation may be performed. Human agreement between our expert annotations and the original ones may be measured, and the two annotations agree with 72.3% precision, 90.0% recall, and 80.2% F-measure.

Table 2 summarizes a comparison of an exemplary embodiment of the present disclosure to the alleged results of other types of data driven approaches on the metric provided by Formula (2) as well as metrics described above, on original datasets and re-labeled datasets, as discussed above. On the re-labeled dataset, an exemplary embodiment of the present disclosure may outperform the alleged results, as well as itself compared to the original dataset. The increase in precision and F-measure based on Formula (2) may show that neural networks are able to exploit the rich visual structure of spreadsheets better than shallow classification methods.

TABLE 2

| Dataset | Method | $P_{DE}$ | $R_{DE}$ | $F_{DE}$ | P | R | F | I |
|---|---|---|---|---|---|---|---|---|
| Original | Other Approach | 65.0 | 63.0 | 63.9 | — | — | — | — |
| | Present Disclosure | 68.5 | 47.6 | 56.1 | 57.9 | 88.6 | 70.1 | 81.3 |
| Re-labeled | Present Disclosure | 70.9 | 61.5 | 65.9 | 68.7 | 89.5 | 77.8 | 84.9 |

As shown in Table 2, $P_{DE}$, $R_{DE}$, and $F_{DE}$ denote precision, recall, and F-measure with a match between two tables recorded as per Formula (2), respectively, P denotes Jaccard precision, R denotes Jaccard recall, F denotes F-measure, and I denotes NMI. Each value shown in Table 2 is in percentages (%).

Figure 6:
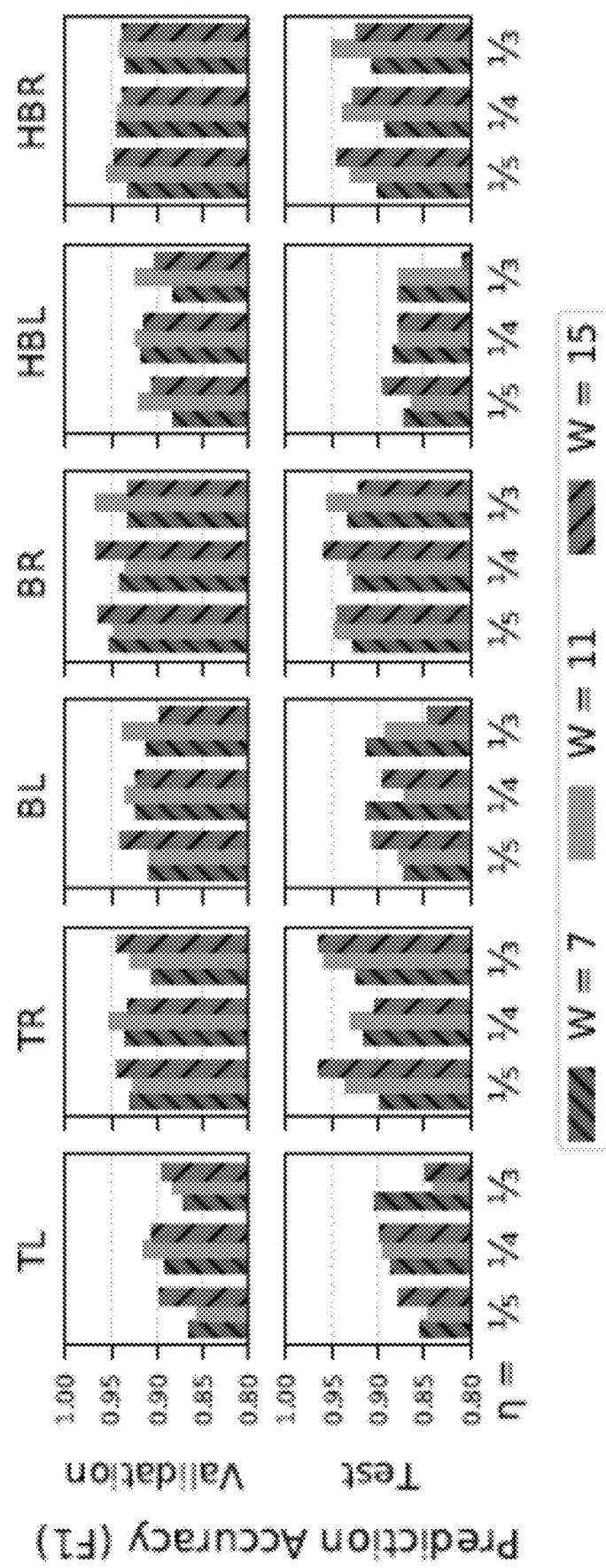
FIG. 6 depicts bar graphs of accuracy of corner identification models and ablations, according to embodiments of the present disclosure.

As discussed above, regularization techniques may improve accuracy of corner identification, according to embodiments of the present disclosure. FIG. 6 depicts bar graphs of accuracy of corner identification models and ablations, according to embodiments of the present disclosure. The results of corner identification using neural network models according to embodiments of the present disclosure may be evaluated as F-measures of their prediction accuracies on different corner classes on a validation dataset and a test dataset. The groups on the x-axis of the bar graphs may depicts different values of the hyper-parameter η, which may control an amount of not-a-corner training example. The different values of patch size W may be depicted by the hashing of the bars. Each of the neural network models may indicate consistently high accuracies, in which relative accuracy of each corner class varies. The values η=¼ and W=11 may be selected based on their average performance over all corner classes on the validation set.

Figure 7:
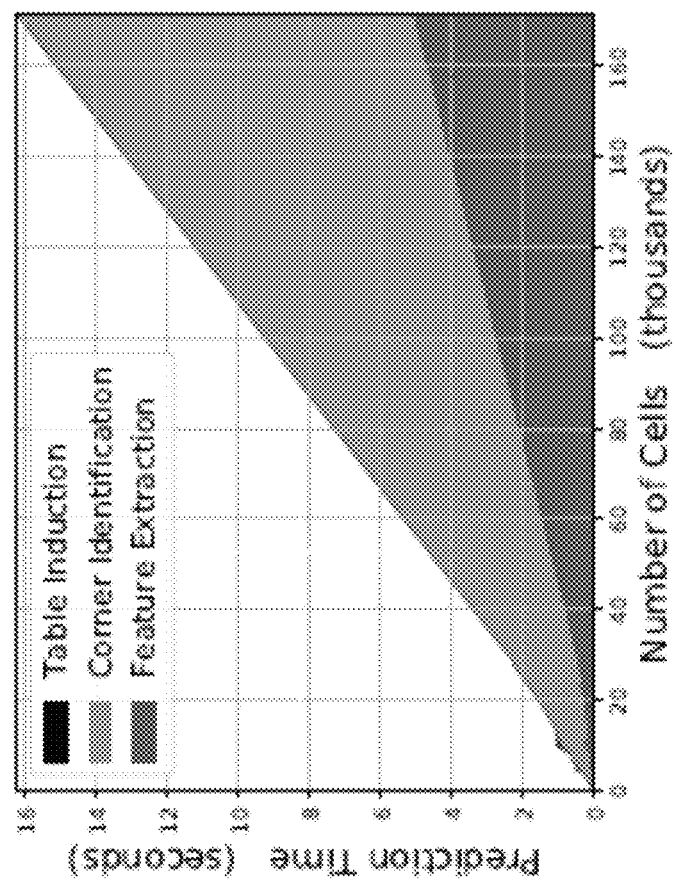
FIG. 7 depicts a graph of a runtime of stages of table identification as a function of spreadsheet size, according to embodiments of the present disclosure.

Based on exemplary embodiments of the present disclosure, table identification may be possible for real-time usage on consumer-grade hardware. FIG. 7 depicts a graph of a runtime of stages of table identification as a function of spreadsheet size, according to embodiments of the present disclosure. As shown in FIG. 7, the amount of time to identify tables compared to the number of cells in a spreadsheet is linear, with the median runtime of 71 milliseconds. A majority of the time may be spent on extracting features from the spreadsheet and corner identification. Corner identification over multiple patches may be run in parallel on a GPU, and automatically benefits from any further parallelization.

While FIGS. 1 and 2 depict a neural network framework, those skilled in the art will appreciate that neural networks may be conducted in regard to a model and may include phases: model creation (neural network training), model validation (neural network testing), and model utilization (neural network evaluation), though these phases may not be mutually exclusive. According to embodiments of the present disclosure, neural networks may be implemented through training, inference, and evaluation stages. At least one server may execute a machine learning component of the table identification system described herein. As those skilled in the art will appreciate, machine learning may be conducted in regard to a model and may include multiple phases: model creation, model testing, model validation, and model utilization, though these phases may not be mutually exclusive. Further, model creation, testing, validation, and utilization may be on-going processes of a machine learning.

During a first phase of machine learning, the model creation phase may involve extracting features from spreadsheets of a training data set. As those skilled in the art will appreciate, these extracted features and/or other data may be derived from statistical analysis and/or machine learning techniques on large quantities of data collected over time based on patterns. Based on the observations of this monitoring, the machine learning component may create a model (i.e., a set of rules or heuristics) for identifying corners from spreadsheets. As discussed above, the neural network may be trained to deemphasize false negatives.

During a second phase of machine learning, the model created during the model creation phase may be tested and/or validated for accuracy. During this phase, the machine learning component may receive spreadsheets from a test dataset and/or a validation dataset, extract features from the test dataset and/or the validation dataset, and compare those extracted features against predicted labels made by the model. Through continued tracking and comparison of this information and over a period of time, the machine learning component may determine whether the model accurately predicts which parts of the spreadsheets are likely to be corners. This testing and/or validation is typically expressed in terms of accuracy: i.e., what percentage of the time does the model predict the labels. Information regarding the success or failure of the predictions by the model may be fed back to the model creation phase to improve the model and, thereby, improve the accuracy of the model.

A third phase of machine learning may be based on a model that is validated to a predetermined threshold degree of accuracy. For example, a model that is determined to have at least a 50% accuracy rate may be suitable for the utilization phase. According to embodiments of the present disclosure, during this third, utilization phase, the machine learning component may identify corners from spreadsheets where the model suggests that a corner is present. Upon encountering a corner, the model suggests that what type of corner is present and may store the data. Of course, information based on the confirmation or rejection of the various stored corners may be returned back to the previous phases (test, validation, and creation) as data to be used to refine the model in order to increase the model's accuracy.

While the present disclosure specifically discusses spreadsheet processing, aspects of the present disclosure may be applicable not only to spreadsheets, but may also be applicable to flexible data arrangements and/or classification problems.

As described above and below, embodiments of the present disclosure allow for reduction in computational complexity and memory demand, which may also reduce power consumption. Embodiments of the present disclosure may be implemented on mobile devices, such as Smartphones, tablets, and/or even wearable items, smart speakers, computers, laptops, car entertainment systems, etc.

Figure 8:
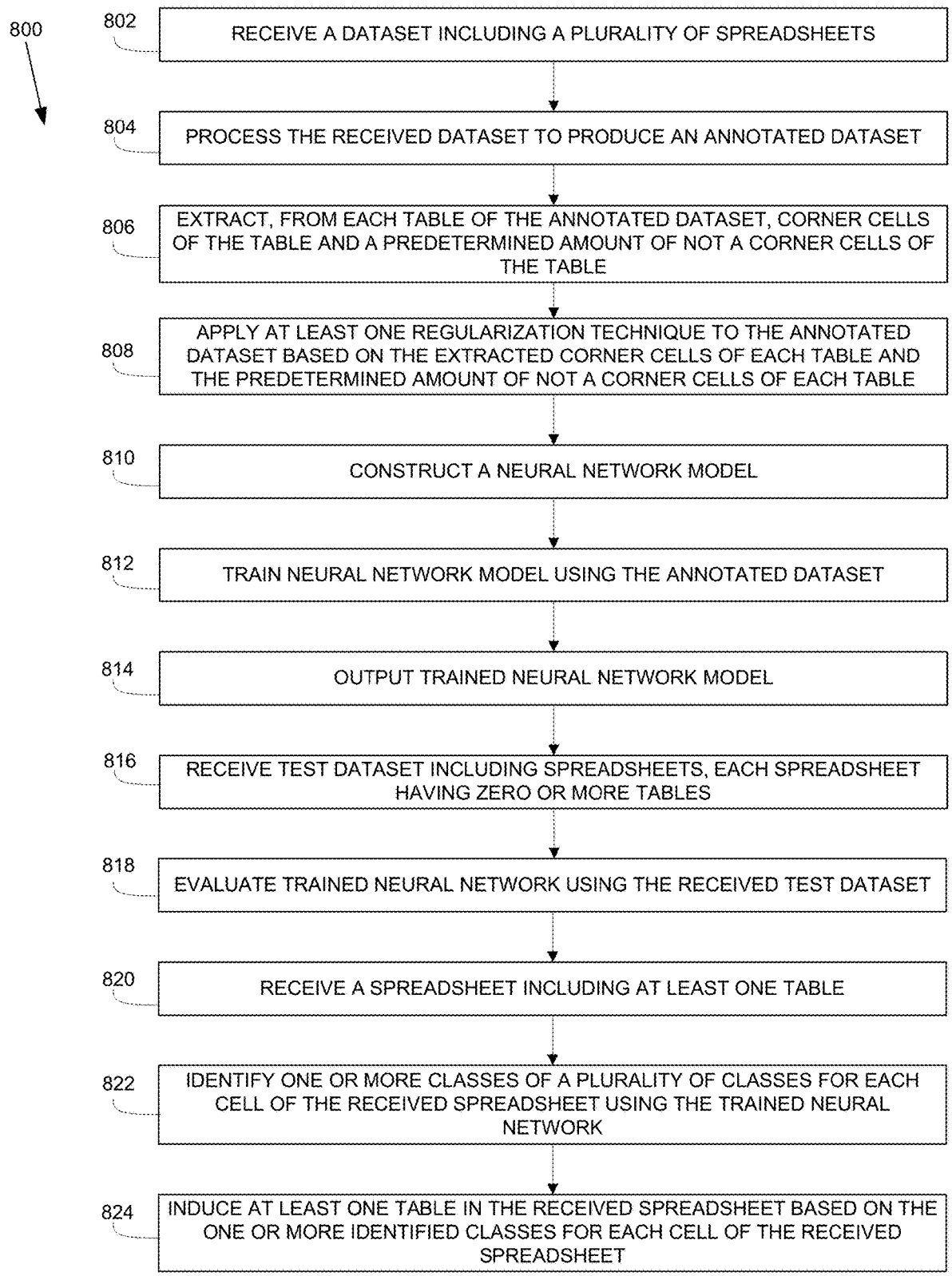
FIG. 8 depicts a method for improved table identification using a neural network, according to embodiments of the present disclosure.

FIG. 8 depicts a method 800 for improved table identification, such as by using machine learning including a neural network, according to embodiments of the present disclosure. Method 800 may begin at step 802, in which a dataset including a plurality of spreadsheets, where at least one spreadsheet of the plurality of spreadsheets includes at least one table, may be received. Each cell of the received spreadsheet may include a predetermined amount of channels that encode visual and other features of the cell, and the features may include font style, colors, borders, alignment, datatype formatting, etc.

Then, at step 804, the dataset may be processed to produce an annotated dataset, the annotated dataset including a plurality of annotated spreadsheets having identified tables, corners, and header rows. Before annotating, the spreadsheets may be processed by a service to determine whether each spreadsheet included tables having data. Then, a second service may annotate the remaining spreadsheets. Further, for each spreadsheet, annotators may identify one or more tables in the spreadsheet, and label corners of each table and any header rows of the table.

At step 806, from each table of the annotated dataset, corner cells of the table and a predetermined amount of not-a-corner cells of the table may be extracted. Then, at step 808, at least one regularization technique may be applied to the annotated dataset based on the extracted corner cells of each table and the predetermined amount of not-a-corner cells of each table. The predetermined amount of not-a-corner cells of the table may include not-a-corner cells of tables from predetermined locations in the table. The predetermined locations of not-a-corner cells of tables may include one or more of a table center of a table, midpoints of sides of the table, gaps between the headers and data of the table, cells surrounding table corners of the table, and random cells normally distributed around the target corners of the table.

The at least one regularization technique may include one or more of i) undersampling, based on a hyper-parameter that may be optimized on a validation set, a number of not-a-corner cells for each table, ii) applying a dropout in an architecture of the neural network model, iii) applying data augmentation to introduce additional corner examples with synthetic noise, where each synthetic example adds a small random noise around a corner cell to cells not in a table, and iv) re-scaling weights for the annotated dataset so that a total weight for corner cells match a total weight of not-a-corner cells. Synthetic noise may follow a symmetric bimodal normal distribution with peaks at edges of an input cell and $\sigma=(W/2)^{1/4}$.

At step 810, a neural network model, including a plurality of neurons, configured to output the one or more classes of the plurality of classes for each cell of the received spreadsheet, the plurality of neurons arranged in a plurality of layers, including at least one hidden layer, and being connected by a plurality of connections may be constructed. The at least one hidden layer of the neural network model may comprise at least one long short-term memory layer. Of course, construction of the neural network model may occur any time before use of the neural network model, and construction of the neural network model may not be limited to occurring before and/or after at least the above steps.

At step 812, the neural network model may be trained using the annotated dataset, the neural network model may be configured to output the one or more classes of the plurality of classes for each cell of a received spreadsheet. Further, the trained neural network model may comprise a convolutional neural network. The plurality of classes may include a top-left corner, a top-right corner, a bottom-left corner, a bottom-right corner, a header bottom-left corner, header bottom-right corner, and not-a-corner, as discussed above. Once the neural network model is trained, at step 814, the trained neural network model configured to output the one or more classes of the plurality of classes for each cell of a received spreadsheet may be outputted.

Once the neural network model is trained, at step 816, a test dataset and/or a validation dataset including spreadsheets, each spreadsheet having zero or more tables, may be received. Then at step 818, the trained neural network using the received test dataset may be evaluated. Alternatively, steps 816 and 818 may be omitted, and/or may be performed at a different time. Once evaluated to pass a predetermined threshold, the trained neural network may be utilized. Additionally, in certain embodiments of the present disclosure, steps of method 800 may be repeated to produce a plurality of trained neural networks. The plurality of trained neural networks may then be compared to each other and/or other neural networks.

At step 820, a spreadsheet including at least one table may be received, where each cell of the received spreadsheet includes a predetermined amount of channels that encode visual and other features of the cell. Then at step 822, one or more classes of the plurality of classes may be identified for each cell of the received spreadsheet using a neural network model, where the plurality of classes may include at least corners and not-a-corner. The identifying may include classifying each cell of the received spreadsheet based on the predetermined amount of channels that encode visual and other features of the cell. Additionally, and/or alternatively, the classifying of each cell of the received spreadsheet may be further based on an immediate surrounding context of the cell.

Then, at step 824, at least one table in the received spreadsheet may be induced based on the one or more identified classes for each cell of the received spreadsheet, where the induction may be done by using a probabilistic graphical model. The inducing, using the probabilistic graphical model, the at least one table in the received spreadsheet may include estimating probabilities of corners appearing at an intersection of corresponding boundary lines, computing a spatial confidence score of each candidate table, and selecting each candidate table as a table when the spatial confidence score of the table is greater than a predetermined threshold. The predetermined threshold may be a hyper-parameter optimized based on a validation dataset.

Figure 9:
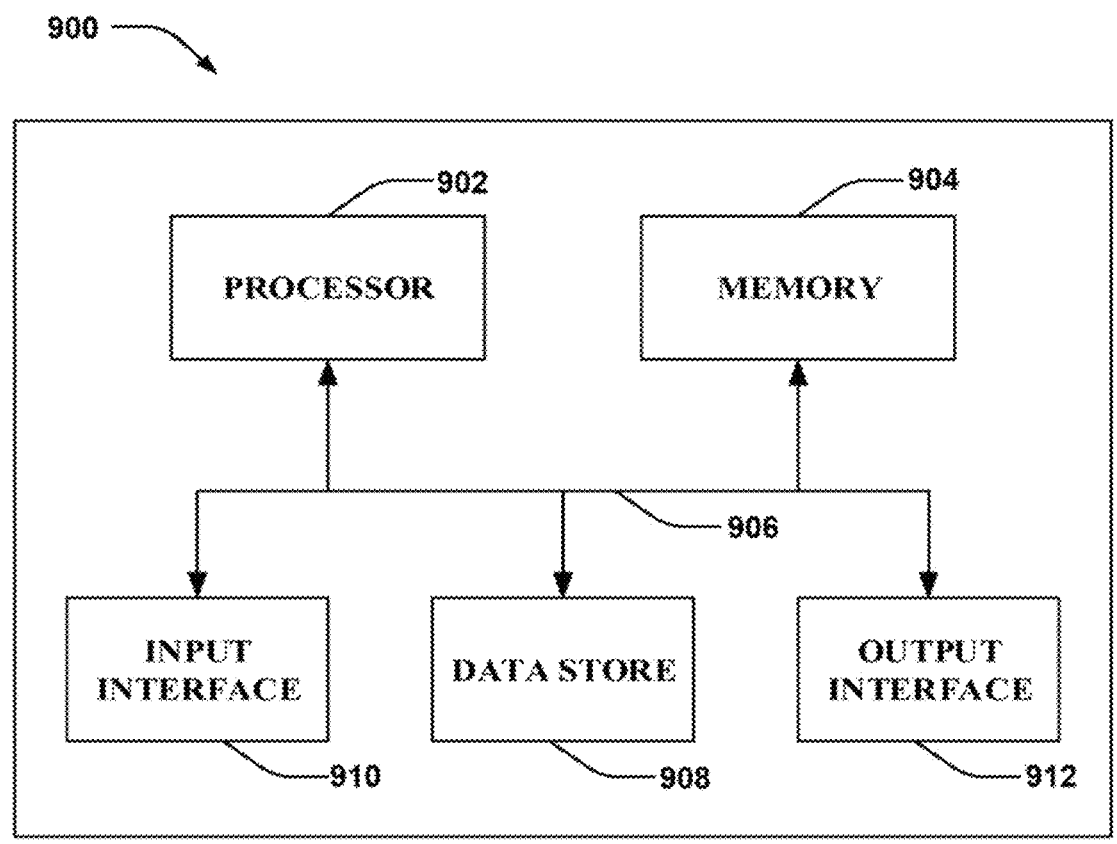
FIG. 9 depicts a high-level illustration of an exemplary computing device that may be used in accordance with the systems, methods, and computer-readable media disclosed herein, according to embodiments of the present disclosure.

FIG. 9 depicts a high-level illustration of an exemplary computing device 900 that may be used in accordance with the systems, methods, modules, and computer-readable media disclosed herein, according to embodiments of the present disclosure. For example, the computing device 900 may be used in a system that processes data, such as a spreadsheet, using a neural network, according to embodiments of the present disclosure. The computing device 900 may include at least one processor 902 that executes instructions that are stored in a memory 904. The instructions may be, for example, instructions for implementing functionality described as being carried out by one or more components discussed above or instructions for implementing one or more of the methods described above. The processor 902 may access the memory 904 by way of a system bus 906. In addition to storing executable instructions, the memory 904 may also store data, spreadsheets, one or more neural networks, and so forth.

The computing device 900 may additionally include a data store, also referred to as a database, 908 that is accessible by the processor 902 by way of the system bus 906. The data store 908 may include executable instructions, data, examples, features, etc. The computing device 900 may also include an input interface 910 that allows external devices to communicate with the computing device 900. For instance, the input interface 910 may be used to receive instructions from an external computer device, from a user, etc. The computing device 900 also may include an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 900 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for example, several devices may be in communication by way of a network connection and may collectively perform tasks described as being performed by the computing device 900.

Figure 10:
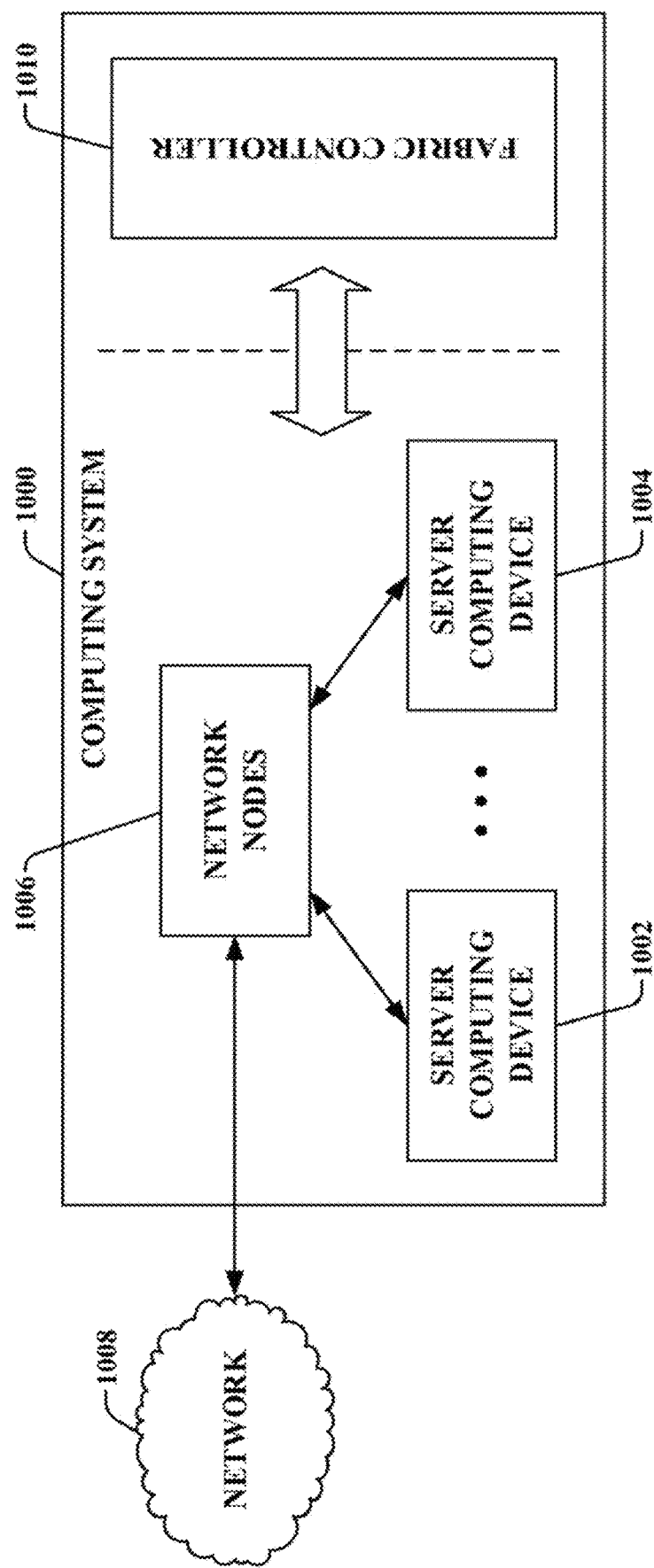
FIG. 10 depicts a high-level illustration of an exemplary computing system that may be used in accordance with the systems, methods, and computer-readable media disclosed herein, according to embodiments of the present disclosure.

Turning to FIG. 10, FIG. 10 depicts a high-level illustration of an exemplary computing system 1000 that may be used in accordance with the systems, methods, modules, and computer-readable media disclosed herein, according to embodiments of the present disclosure. For example, the computing system 1000 may be or may include the computing device 900. Additionally, and/or alternatively, the computing device 900 may be or may include the computing system 1000.

The computing system 1000 may include a plurality of server computing devices, such as a server computing device 1002 and a server computing device 1004 (collectively referred to as server computing devices 1002-1004). The server computing device 1002 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 1002, at least a subset of the server computing devices 1002-1004 other than the server computing device 1002 each may respectively include at least one processor and a memory. Moreover, at least a subset of the server computing devices 1002-1004 may include respective data stores.

Processor(s) of one or more of the server computing devices 1002-1004 may be or may include the processor, such as processor 902. Further, a memory (or memories) of one or more of the server computing devices 1002-1004 can be or include the memory, such as memory 904. Moreover, a data store (or data stores) of one or more of the server computing devices 1002-1004 may be or may include the data store, such as data store 908.

The computing system 1000 may further include various network nodes 806 that transport data between the server computing devices 1002-1004. Moreover, the network nodes 1006 may transport data from the server computing devices 1002-1004 to external nodes (e.g., external to the computing system 1000) by way of a network 1008. The network nodes 1002 may also transport data to the server computing devices 1002-1004 from the external nodes by way of the network 1008. The network 1008, for example, may be the Internet, a cellular network, or the like. The network nodes 1006 may include switches, routers, load balancers, and so forth.

A fabric controller 1010 of the computing system 1000 may manage hardware resources of the server computing devices 1002-1004 (e.g., processors, memories, data stores, etc. of the server computing devices 1002-1004). The fabric controller 1010 may further manage the network nodes 1006. Moreover, the fabric controller 1010 may manage creation, provisioning, de-provisioning, and supervising of managed runtime environments instantiated upon the server computing devices 1002-1004.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other hardware medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for improved table identification in a spreadsheet, the method comprising:
    receiving a dataset including a plurality of spreadsheets, wherein at least one spreadsheet of the plurality of spreadsheets includes at least one table;
    processing the dataset to produce an annotated dataset, the annotated dataset including a plurality of annotated spreadsheets having identified tables, corners, and header rows;
    training a neural network model using the annotated dataset, the neural network model configured to output one or more classes of a plurality of classes for each cell of a received spreadsheet;
    receiving a spreadsheet including at least one table;
    identifying, using the neural network model, one or more classes of a plurality of classes for each cell of the received spreadsheet, wherein the plurality of classes include corners, a header bottom-left corner, a header bottom-right corner, and not-a-corner, the header bottom-left corner being a cell directly below a visual table header on a left table boundary, and the header bottom-right corner being a cell directly below a visual table header on a right table boundary;
    inducing at least one table in the received spreadsheet based on the one or more identified classes for each cell of the received spreadsheet; and
    visually identifying a position of each of the induced at least one table in the received spreadsheet.

2. The method according to claim 1, wherein the plurality of classes include a top-left corner, a top-right corner, a bottom-left corner, a bottom-right corner, and not-a-corner.

3. The method according to claim 1, further comprising:
    extracting, from each table of the annotated dataset, corner cells of the table and a predetermined amount of not-a-corner cells of the table; and
    applying at least one regularization technique to the annotated dataset based on the extracted corner cells of each table and the predetermined amount of not-a-corner cells of each table.

4. The method according to claim 3, wherein the predetermined amount of not-a-corner cells of the table include not-a-corner cells of tables from predetermined locations in the table.

5. The method according to claim 4, wherein the predetermined locations of not-a-corner cells of tables include one or more of a table center of the table, midpoints of sides of the table, gaps between the headers and data of the table, cells surrounding table corners of the table, and random cells normally distributed around corners of the table.

6. The method according to claim 3, wherein the at least one regularization technique includes one or more of i) undersampling, based on a hyper-parameter that optimized on a validation set, a number of not-a-corner cells for each table, ii) applying a dropout in an architecture of the neural network model, iii) applying data augmentation to introduce additional corner examples with synthetic noise, where each synthetic example adds a small random noise around a corner cell to cells not in the table, and iv) re-scaling weights for the annotated dataset to provide a total weight for corner cells that match a total weight of not-a-corner cells.

7. The method according to claim 6, wherein the synthetic noise follows a symmetric bimodal normal distribution with peaks at edges of an input cell and a predetermined formula.

8. The method of claim 1, wherein the trained neural network model comprises a convolutional neural network.

9. The method according to claim 1, further comprising:
    constructing the neural network model, including a plurality of neurons, configured to output the one or more classes of the plurality of classes for each cell of the received spreadsheet, the plurality of neurons arranged in a plurality of layers, including at least one hidden layer, and being connected by a plurality of connections.

10. The method according to claim 1, wherein each cell of the received spreadsheet includes a predetermined amount of channels that encode one or more of visual and other features of the cell, and
    wherein identifying, using the neural network model, one or more classes of the plurality of classes for each cell of the received spreadsheet includes classifying each cell of the received spreadsheet based on the predetermined amount of channels that encode the one or more of visual and other features of the cell.

11. The method according to claim 10, wherein classifying each cell of the received spreadsheet is further based on an immediate surrounding context of the cell.

12. The method according to claim 1, wherein inducing the at least one table in the received spreadsheet based on the one or more identified classes for each cell of the received spreadsheet includes using a probabilistic graphical model to induce the at least one table.

13. The method according to claim 12, wherein inducing, using the probabilistic graphical model, the at least one table in the received spreadsheet includes:
    estimating probabilities of corners appearing at an intersection of corresponding boundary lines;
    computing a spatial confidence score of each candidate table; and select each candidate table as the table when the spatial confidence score of the table is greater than a predetermined threshold.

14. The method according to claim 13, wherein the predetermined threshold is a hyper-parameter optimized based on a validation dataset.

15. The method according to claim 1, further comprising:
receiving a test dataset, the test dataset including a plurality of spreadsheets, each spreadsheet having at least one table; and
evaluating the trained neural network using the received test dataset.

16. A system for improved table identification in a spreadsheet, the system including:
a data storage device that stores instructions for improved table identification in a spreadsheet; and
a processor configured to execute the instructions to perform a method including:
receiving a dataset including a plurality of spreadsheets, wherein at least one spreadsheet of the plurality of spreadsheets includes at least one table;
processing the dataset to produce an annotated dataset, the annotated dataset including a plurality of annotated spreadsheets having identified tables, corners, and header rows;
training a neural network model using the annotated dataset, the neural network model configured to output one or more classes of a plurality of classes for each cell of a received spreadsheet;
receiving a spreadsheet including at least one table;
identifying, using the neural network model, one or more classes of the plurality of classes for each cell of the received spreadsheet, wherein the plurality of classes include corners, a header bottom-left corner, a header bottom-right corner, and not-a-corner, the header bottom-left corner being a cell directly below a visual table header on a left table boundary, and the header bottom-right corner being a cell directly below a visual table header on a right table boundary;
inducing at least one table in the received spreadsheet based on the one or more identified classes for each cell of the received spreadsheet; and
visually identifying a position of each of the induced at least one table in the received spreadsheet.

17. The system according to claim 16, wherein inducing the at least one table in the received spreadsheet based on the one or more identified classes for each cell of the received spreadsheet includes using a probabilistic graphical model to induce the at least one table, and
wherein inducing, using the probabilistic graphical model, the at least one table in the received spreadsheet includes:
estimating probabilities of corners appearing at an intersection of corresponding boundary lines;
computing a spatial confidence score of each candidate table; and
select each candidate table as a table when the spatial confidence score of the table is greater than a predetermined threshold.

18. A computer-readable storage device storing instructions that, when executed by a computer, cause the computer to perform a method for improved table identification in a spreadsheet, the method including:
receiving a dataset including a plurality of spreadsheets, wherein at least one spreadsheet of the plurality of spreadsheets includes at least one table;
processing the dataset to produce an annotated dataset, the annotated dataset including a plurality of annotated spreadsheets having identified tables, corners, and header rows;
training a neural network model using the annotated dataset, the neural network model configured to output one or more classes of a plurality of classes for each cell of a received spreadsheet;
receiving a spreadsheet including at least one table;
identifying, using the neural network model, one or more classes of the plurality of classes for each cell of the received spreadsheet, wherein the plurality of classes include corners, a header bottom-left corner, a header bottom-right corner, and not-a-corner, the header bottom-left corner being a cell directly below a visual table header on a left table boundary, and the header bottom-right corner being a cell directly below a visual table header on a right table boundary;
inducing at least one table in the received spreadsheet based on the one or more identified classes for each cell of the received spreadsheet; and
visually identifying a position of each of the induced at least one table in the received spreadsheet.

* * * * *